United States Patent [19]

Shaw

[11] 3,790,757

[45] Feb. 5, 1974

[54] DATA RECORDING AND READOUT TAPE

[76] Inventor: Joseph Denman Shaw, 508 Church St., Brownsville, Pa. 15417

[22] Filed: July 18, 1972

[21] Appl. No.: 272,772

[52] U.S. Cl. ............ 235/61.12 R, 178/112, 197/20, 200/46

[51] Int. Cl. .......................................... G06k 19/00

[58] Field of Search 235/61.11 D, 61.12 R, 61.12 M, 235/61.12 N; 200/46; 178/111, 112; 197/20

[56] References Cited

UNITED STATES PATENTS

| | | | |
|---|---|---|---|
| 3,604,901 | 9/1971 | Morita et al. | 235/61.12 R |
| 3,319,257 | 5/1967 | Rosehke | 235/61.12 R |
| 3,621,969 | 11/1971 | Gotschewski et al. | 197/20 |
| 2,849,542 | 8/1958 | MacChesney | 235/61.11 D |
| 2,254,931 | 9/1941 | Bryce | 235/61.12 M |
| 3,508,032 | 4/1970 | MacDuffee et al. | 235/61.11 D |
| 3,586,593 | 6/1971 | Dahl, Jr. | 235/61.12 M |
| 3,632,995 | 1/1972 | Wilson | 235/61.12 N |

*Primary Examiner*—Daryl W. Cook

[57] ABSTRACT

A tape having a longitudinally folded, two-ply structure adapted for the recordation of machine readable language on at least one of said plies while the other ply is adapted to receive printed data corresponding to the machine readable language in an arrangement whereby upon unfolding of the tape the printed data is visible to an operator as the corresponding language is sensed and read out by the tape reader.

8 Claims, 10 Drawing Figures

PATENTED FEB 5 1974

3,790,757

SHEET 1 OF 2

DATA RECORDING AND READOUT TAPE

This invention relates to improved data recording and readout tape and is particularly directed to that kind of tape which includes a line of legible printing corresponding to the machine readable language recorded on the tape. At the present time automatic electric typewriters are provided with attachments which code punch machine readable language in tapes supplied in single strip form and simultaneously print the corresponding legible data on the tape. These machines now record machine readable language on the tape and print the corresponding data on the back face of the tape and when the tape is interpreted by a reader the printed data is again on the back of the tape and not visible to the operator during the readout process.

It is therefore the main concern of this invention to provide a tape prepared with recorded machine readable language and corresponding printed data which can be read by the operator as the corresponding language is being interpreted by the readout device.

Another object of the invention is to provide a tape having the foregoing characteristics which may be used in conventional automatic coding, printing and readout equipment.

Other objects of the invention will become apparent from the following specification taken in conjunction with the accompanying drawing.

Figures 1, 2, 3, 4, 5, 6:
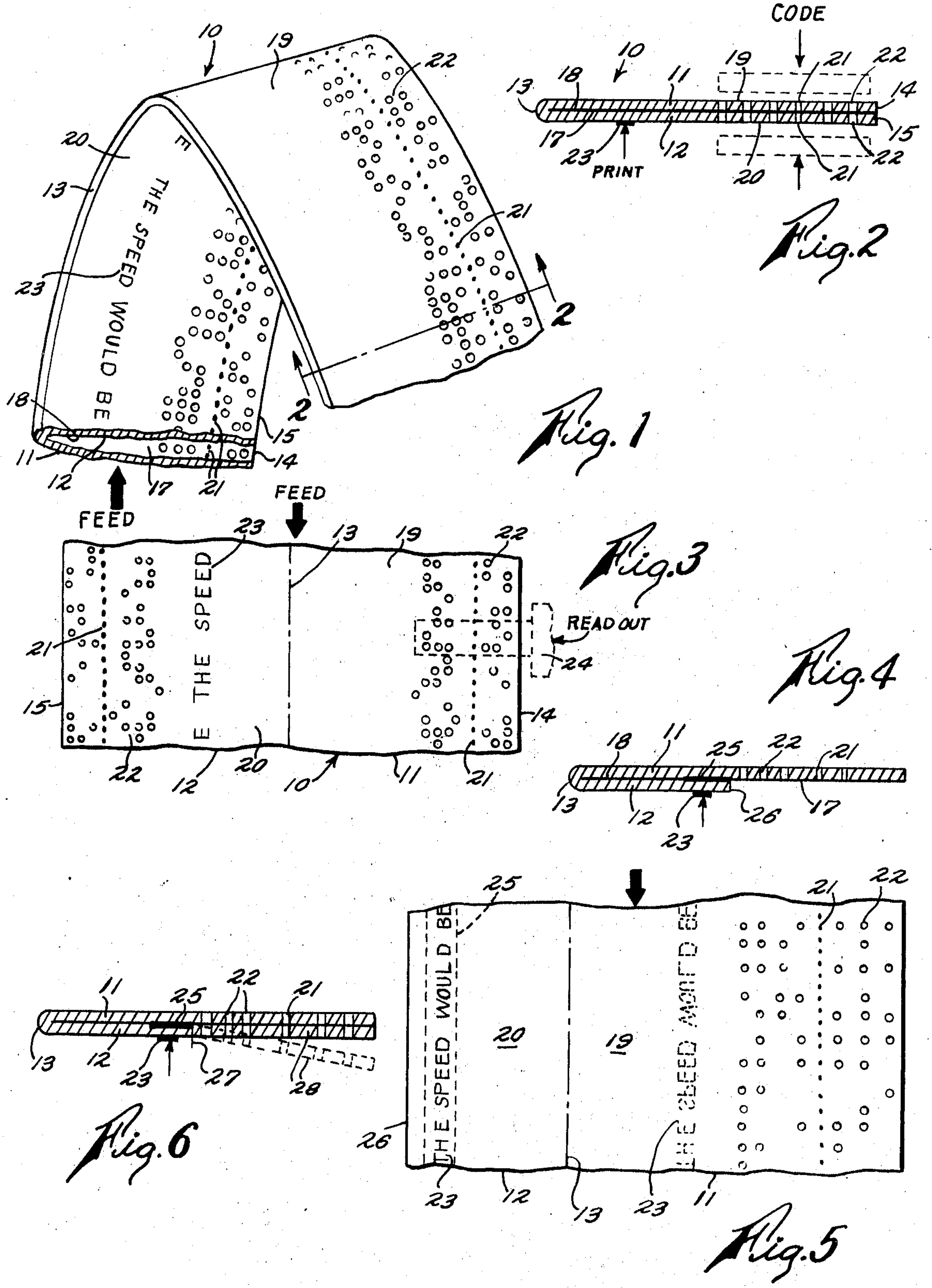
FIG. 1 is a fragmental, perspective view of the preferred tape of this invention.
FIG. 2 is an enlarged section on line 2—2 of FIG. 1.
FIG. 3 is a fragmental plan view of the tape shown in FIGS. 1 and 2 of the drawings in the process of being interpreted.
FIG. 4 is a section like FIG. 2 showing a modified form of my tape.
FIG. 5 is a fragmental, plan view of the tape shown in FIG. 4 in the process of being interpreted.
FIG. 6 is a section like FIG. 2 showing another modification of this invention.

With reference to FIGS. 1–3 of the drawings the numeral 10 generally identifies a preferred embodiment of my data recording and readout tape which has two plies 11 and 12 integrally connected together along common longitudinal side portions by a return fold portion 13, the longitudinal free edges 14 and 15 of the plies 11 and 12, respectively, opposed to the fold 13 being in alignment with each other. The plies 11 and 12 of the folded tape 10 have inside faces 17 and 18, respectively, in confronting engagement with each other while the exposed faces of the folded tape 10 has, for convenience of reference, an obverse face 19 and a reverse face 20. The two plies 11 and 12 of the tape 10 are each provided with a longitudinal row of registered tape feed holes 21—21 that cooperate with the teeth in feed wheels of conventional coding, punching and readout apparatus (not shown). It is contemplated that the tape 10 be folded in a zig-zag fashion for packaging and use but may also be put up in roll form, if desired.

As indicated by the arrow in FIG. 1 the tape 10 in use has just been fed through and has exited from a code punching and printing machine of conventional design (not shown) wherein machine readable language 22 has been punched through both plies 11 and 12 of the tape adjacent the row of feed wheel holes 21 and the data or message 23 corresponding to the language has been printed on the reverse face 20 of the folded tape.

To read out and interpret the encoded tape shown in FIGS. 1 and 2 the tape is laid out in flat condition (FIG. 3) before it is fed into conventional readout apparatus in the direction of the arrow whereby the obverse face 19 and the reverse face 20 of the folded tape 10 lie in a common plane and the machine readable language 22 is sensed and interpreted by the reader head 24 of the apparatus while the operator will have the reverse face 20 of the tape facing him so that he may be immediately cognizant of the data 23 being read out by the reader head 24.

Now with reference to FIGS. 4 and 5 of the drawings which show a modified form of my folded tape the one ply 12 is substantially narrower than the ply 11 and the feed holes 21 and the machine readable language 22 are punched only in the ply 11. The inside face 18 of the ply 12 may have a longitudinal strip of pressure sensitive transfer material 25 along its free edge portion 26 whereby the printed material 23 will be transferred to the inside face 17 of the ply 11. As in the preferred form of my invention this tape is also opened out flat (FIG. 5) for interpretation by a readout apparatus and it will be noted that the printed data 23 on the reverse face 20 of the tape can be read by the operator of the read-out device.

FIG. 6 of the drawings shows another modification of my tape wherein a longitudinal line of perforations 27 are formed in the ply 12 between the machine readable language 22 and the printed data 23 to form a tear strip 28 on the ply 12 so that said strip may be severed from the ply leaving only one set of machine readable language and feed wheel holes on the tape for readout purposes.

Figure 7:
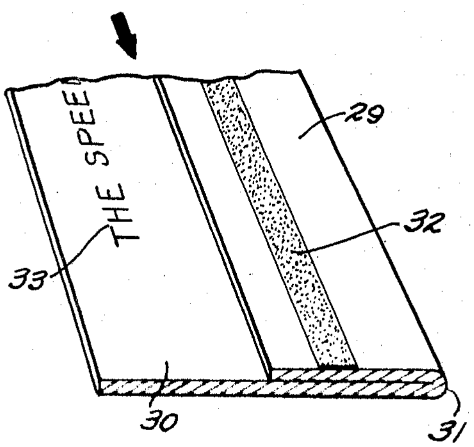
FIG. 7 is a fragmental, perspective view of a further modification of my invention.
Figure 8:
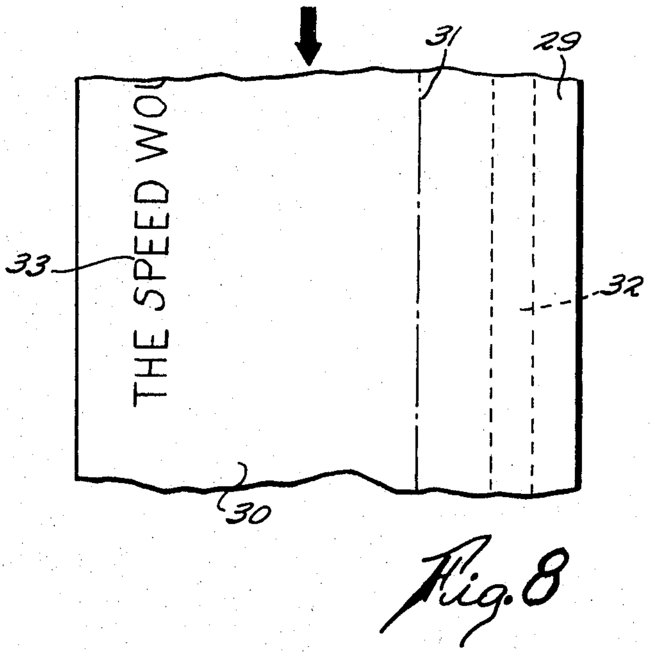
FIG. 8 is a fragmental, plan view of the modification shown in FIG. 7 in the process of being interpreted.

Now with reference to FIGS. 7 and 8 of the drawings this modified form of my invention is a tape having two plies 29 and 30 folded along longitudinal side portions by a return bend 31, the ply 29 being substantially narrower than ply 30. Machine readable language is recorded on a magnetic stripe 32 provided the ply 29 and printed material 33 corresponding to the recorded language is printed on the ply 30. When this modified form of tape is to be interpreted it is unfolded to the flat condition shown in FIG. 8 whereby the printed data 33 on ply 30 is legible by the operator while the recorded machine readable language on the stripe 32 is interpreted from the underface of the ply 29. This tape is adapted to be fed through the machines by driven friction wheels and does not require feed wheel holes.

Figure 9:
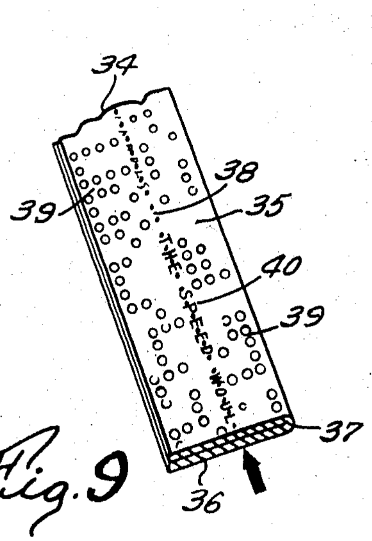
FIG. 9 is a fragmental perspective view of a still further modification of my invention.
Figure 10:
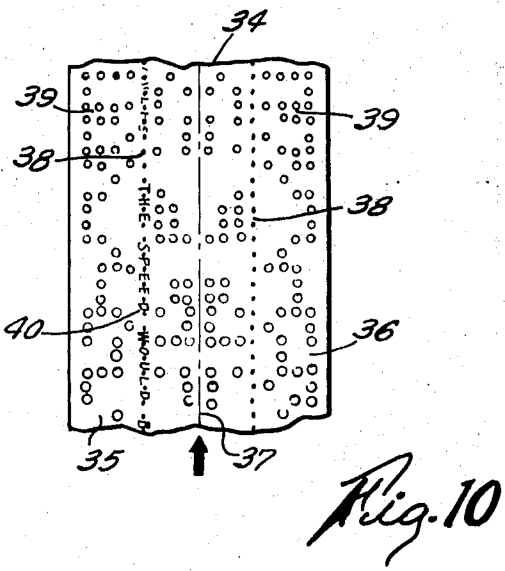
FIG. 10 is a fragmental plan view of the modification shown in FIG. 9 in the process of being interpreted.

A still further modification of my invention is shown in FIGS. 9 and 10 of the drawings wherein my tape 34 has two plies 35 and 36 of equal widths and longitudinally connected together by a return bend portion 37. The plies are each provided with a longitudinal row of registered feed holes 38. Machine readable language 39 is punched in both plies 35 and 36 and corresponding data 40 is printed on the ply 35 between the feed holes 38. When this tape is unfolded flat as is indicated in FIG. 10 for interpretation the data 40 will be legible by the operator while the corresponding machine readable language is interpreted from the ply 36.

It will therefore be understood that I have provided a novel two-ply tape susceptible of being recorded with machine readable language and printed with the corresponding legible data and which is simply rearranged to be thereafter interpreted on a tape reader with the message facing the operator whereby said operator is immediately made cognizant of the data being sensed and read out by the tape reader.

What is claimed is:

1. A data recording and readout two-ply tape having the two plies integrally joined along common side portions by a longitudinally extending return fold portion, the folded plies initially having inside faces in confronting engagement for recordation of the tape, at least one of said plies being adapted to receive recorded machine readable language, and the outside face of the other said ply being adapted to receive recorded printed data thereon corresponding to said machine readable language; the plies of the recorded tape being unfolded to a flat condition around the fold for readout purposes, whereby the recorded printed data is visually readable as the machine readable language is sensed and interpreted by readout apparatus.

2. A data recording and readout tape as set forth in claim 1 wherein the one said ply has a longitudinally extending stripe of magnetic material adapted to record the machine readable language.

3. A data recording and readout tape as set forth in claim 1 wherein the inside face of the other said ply has a longitudinal stripe of pressure sensitive transfer material along the area of said ply adapted to receive the printed data.

4. A data recording and readout two-ply tape having the two plies integrally connected along common side portions by a longitudinally extending return fold portion, the folded plies initially having inside faces in confronting engagement for recordation of the tape, a longitudinal row of tape feed holes formed through at least one ply, said folded tape having obverse and reverse faces thereon, at least one of said ples being adapted to receive recorded machine readable language thereon, and the reverse face of the tape on the other ply being adapted to receive recorded printed visually readable data thereon corresponding to the said machine readable language; the plies of the recorded tape being unfolded to a flat condition around the fold for readout purposes, whereby the recorded printed data is visually readable as the machine readable language is sensed and interpreted by the readout apparatus.

5. A data recording and readout tape as set forth in claim 4 wherein the two plies have the same width and the tape feed holes and machine readable language are formed through both plies.

6. A data recording and readout tape as set forth in claim 4 wherein a line of body weakening perforations are formed through the ply having the reverse face thereon, said line being disposed between the printed data and the machine readable language whereby a tear strip is formed on the ply containing the language for severance from the tape.

7. A data recording and readout tape as set forth in claim 4 wherein the ply having the reverse face thereon is narrower than the ply with the obverse face, said first mentioned ply having a longitudinal edge terminating between the printed data and the machine readable language.

8. A data recording and readout tape as set forth in claim 4 wherein the inside face of the ply containing the reverse face is provided with a line of pressure sensitive transfer material subjacent the printed data area on said reverse face.

* * * * *